(12) United States Patent
Liu et al.

(10) Patent No.: US 11,216,904 B2
(45) Date of Patent: Jan. 4, 2022

(54) IMAGE PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Wentao Liu, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/858,818

(22) Filed: Apr. 27, 2020

(65) Prior Publication Data
US 2020/0258192 A1    Aug. 13, 2020

Related U.S. Application Data

(63) Continuation of application No. PCT/CN2018/124320, filed on Dec. 27, 2018.

(30) Foreign Application Priority Data

May 31, 2018    (CN) .......................... 201810552993.1

(51) Int. Cl.
*G06T 3/00* (2006.01)
*G06T 7/13* (2017.01)
(52) U.S. Cl.
CPC .......... *G06T 3/0012* (2013.01); *G06T 3/0093* (2013.01); *G06T 7/13* (2017.01); *G06T 2207/30196* (2013.01)
(58) Field of Classification Search
None
See application file for complete search history.

(56) References Cited

U.S. PATENT DOCUMENTS 6,747,642 B1 * 6/2004 Yasumoto ............... G06T 15/02
345/419
8,472,747 B2 * 6/2013 Sasaki ..................... H04N 5/272
382/266
(Continued)

FOREIGN PATENT DOCUMENTS

CN     101587586 A     11/2009
CN     103208133 A      7/2013
(Continued)

OTHER PUBLICATIONS

International Search Report in the international application No. PCT/CN2018/124320, dated Mar. 28, 2019, 2 pgs.
(Continued)

*Primary Examiner* — James A Thompson
(74) *Attorney, Agent, or Firm* — Cooper Legal Group, LLC

(57) ABSTRACT

An image processing method and apparatus, an electronic device, and a storage medium are provided. The method includes: performing detection on an image to be processed to determine a contour line of a target object in the image to be processed and a plurality of regions; determining, for a target region in the plurality of regions, first adjustment parameters of target pixel points according to one or more set parameters, where the target pixel points includes one or more first pixel points on the contour line and one or more third pixel points inside the contour line; determining, for the target region, second adjustment parameters of one or more second pixel points according to the first adjustment parameters; and adjusting the image to be processed according to the first adjustment parameters and the second adjustment parameters to obtain an adjusted image.

18 Claims, 9 Drawing Sheets

(56) References Cited

U.S. PATENT DOCUMENTS

| | | | | |
|---|---|---|---|---|
| 8,625,897 | B2* | 1/2014 | Criminisi | G06T 7/11 |
| | | | | 382/173 |
| 2003/0222875 | A1* | 12/2003 | Kawakami | G06T 15/02 |
| | | | | 345/473 |
| 2009/0290796 | A1 | 11/2009 | Shi | |
| 2010/0061637 | A1 | 3/2010 | Mochizuki | |
| 2015/0091900 | A1 | 4/2015 | Yang et al. | |
| 2015/0334398 | A1* | 11/2015 | Socek | G06T 7/174 |
| | | | | 375/240.26 |
| 2016/0328825 | A1 | 11/2016 | Yu | |

FOREIGN PATENT DOCUMENTS

| | | | |
|---|---|---|---|
| CN | 104850847 | A | 8/2015 |
| CN | 105447823 | A | 3/2016 |
| CN | 106558040 | A | 4/2017 |
| CN | 107154030 | A | 9/2017 |
| CN | 107578380 | A | 1/2018 |
| CN | 107730465 | A | 2/2018 |
| CN | 107767333 | A | 3/2018 |
| CN | 107808137 | A | 3/2018 |
| CN | 107886484 | A | 4/2018 |
| JP | 2010152871 | A | 7/2010 |
| JP | 2014002445 | A | 1/2014 |
| KR | 20170047167 | A | 5/2017 |

OTHER PUBLICATIONS

English translation of the Written Opinion of the International Search Authority in the international application No. PCT/CN2018/124320, dated Mar. 28, 2019, 4 pgs.

Office Action of the Indian application No. 202027036610, dated Sep. 10, 2021, 7 pgs.

First Office Action of the Japanese application No. 2020-527769, dated Jul. 19, 2021, 6 pgs.

First Office Action of the Korean application No. 10-2020-7016212, dated Oct. 22, 2021, 9 pgs.

* cited by examiner ained in the same region of the image to be uncoordinated, and bring image distortion.

IMAGE PROCESSING METHOD AND APPARATUS, ELECTRONIC DEVICE, AND STORAGE MEDIUM

CROSS-REFERENCE TO RELATED APPLICATIONS

This is a continuation application of International Patent Application No. PCT/CN2018/124320, filed on Dec. 27, 2018, which claims priority to Chinese Patent Application No. 201810552993.1, filed on May 31, 2018 and entitled "IMAGE PROCESSING METHOD AND APPARATUS, ELECTRONIC DEVICE, AND STORAGE MEDIUM". The disclosures of International Patent Application No. PCT/CN2018/124320 and Chinese Patent Application No. 201810552993.1 are incorporated herein by reference in their entireties.

BACKGROUND

Image beautification refers to processing image information using a computer to meet people's visual psychology or application needs. A person in an image is usually beautified to produce effects such as slimming In the related art, a region to be adjusted in an image may be selected, and adjustment parameters may be set to adjust the region to be adjusted to produce effects such as slimming. However, adjustment modes in the related art may cause different regions of the image to be uncoordinated, and bring image distortion.

SUMMARY

The present disclosure relates to the field of computer technologies, and in particular, to an image processing method and apparatus, an electronic device, and a storage medium.

The present disclosure provides an image processing method and apparatus, an electronic device, and a storage medium.

According to one aspect of the present disclosure, an image processing method is provided, including:

performing detection on an image to be processed to determine a contour line of a target object in the image to be processed and a plurality of regions of the target object;

determining, for a target region in the plurality of regions, first adjustment parameters of a plurality of target pixel points in the target region according to one or more set parameters, where the plurality of target pixel points includes one or more first pixel points on the contour line and one or more third pixel points inside the contour line;

determining, for the target region, second adjustment parameters of one or more second pixel points outside the contour line according to the first adjustment parameters; and adjusting the image to be processed according to the first adjustment parameters and the second adjustment parameters to obtain an adjusted image.

According to one aspect of the present disclosure, an image processing apparatus is provided, including: a detecting module, configured to perform detection on an image to be processed to determine a contour line of a target object in the image to be processed and a plurality of regions of the target object;

a first adjustment parameter determining module, configured to determine, for a target region in the plurality of regions, first adjustment parameters of a plurality of target pixel points in the target region according to one or more set parameters, where the plurality of target pixel points includes one or more first pixel points on the contour line and one or more third pixel points inside the contour line;

a second adjustment parameter determining module, configured to determine, for the target region, second adjustment parameters of one or more second pixel points outside the contour line according to the first adjustment parameters; and an image processing module, configured to adjust the image to be processed according to the first adjustment parameters and the second adjustment parameters to obtain an adjusted image.

According to one aspect of the present disclosure, an electronic device is provided, including:

a processor; and a memory configured to store processor-executable instructions;

where the processor is configured to execute the foregoing image processing method.

According to one aspect of the present disclosure, a computer-readable storage medium is provided, having computer program instructions stored thereon, where when the computer program instructions are executed by a processor, the foregoing image processing method is implemented.

The other features and aspects of the present disclosure can be described more clearly according to the detailed descriptions of the exemplary embodiments in the accompanying drawings.

BRIEF DESCRIPTION OF DRAWINGS

The accompanying drawings included in the description and constituting a part of the description illustrate the exemplary embodiments, features, and aspects of the present disclosure together with the description, and are used for explaining the principles of the present disclosure.

DETAILED DESCRIPTION

Figure 1:
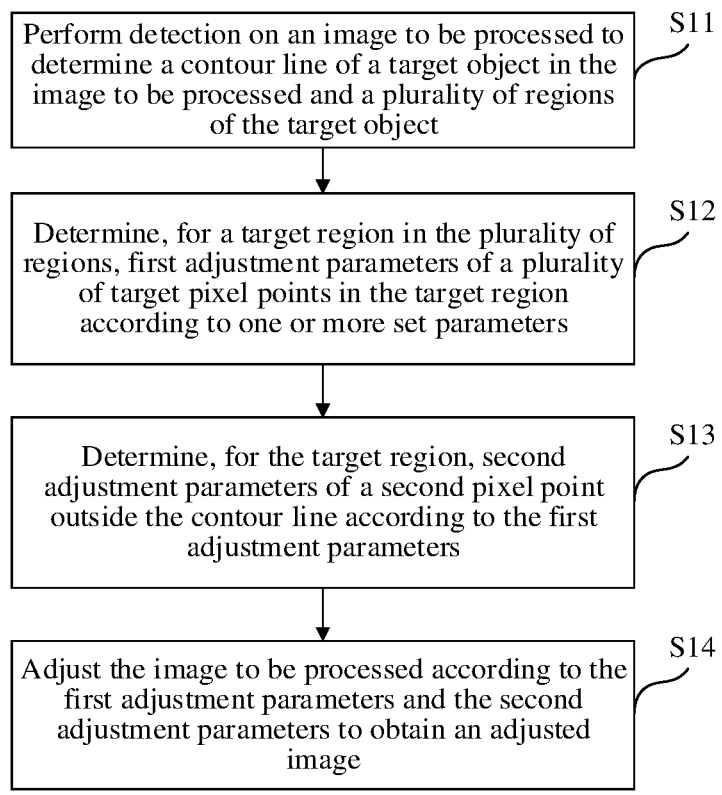
FIG. 1 is a flowchart of an image processing method according to embodiments of the present disclosure.

According to the image processing method and apparatus, the electronic device, and the storage medium provided by the embodiments of the present disclosure, second adjustment parameters of a second pixel point in a background region outside a contour line of a selected target region are determined by first adjustment parameters of target pixel points of the selected target region, and the image to be processed is adjusted according to the first adjustment parameters and the second adjustment parameters, so that the background region may be adaptively adjusted when the target region is adjusted, and thus, the influence on the background region may be reduced when a target object in the image to be processed is adjusted, distortion of the background region may be avoided when the region inside the contour line is adjusted, and the background region of the image may be less deformed and more naturally connected to the region inside the adjusted contour line.

The various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

In addition, numerous details are given in the following detailed description for the purpose of better explaining the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

FIG. 1 is a flowchart of an image processing method according to embodiments of the present disclosure. As shown in FIG. 1, the method includes the following operations.

At operation S11, detection is performed on an image to be processed to determine a contour line of a target object in the image to be processed and a plurality of regions of the target object.

At operation S12, for a target region in the plurality of regions, first adjustment parameters of a plurality of target pixel points in the target region are determined according to one or more set parameters, where the plurality of target pixel points includes a first pixel point on the contour line and a third pixel point inside the contour line.

At operation S13, for the target region, second adjustment parameters of a second pixel point outside the contour line are determined according to the first adjustment parameters.

At operation S14, the image to be processed is adjusted according to the first adjustment parameters and the second adjustment parameters to obtain an adjusted image.

According to the image processing method provided by the embodiments of the present disclosure, one or more pixel points outside the contour line are determined as a second pixel point, and second adjustment parameters of a second pixel point in a background region outside a contour line of a selected target region are determined by first adjustment parameters of target pixel points of the selected target region, and the image to be processed is adjusted according to the first adjustment parameters and the second adjustment parameters, so that the background region may be adaptively adjusted when the target region is adjusted, and thus, the influence on the background region may reduced when a target object in the image to be processed is adjusted, distortion of the background region may be avoided when the region inside the contour line is adjusted, and the background region of the image may be less deformed and more naturally connected to the region inside the adjusted contour line.

In a possible implementation, the image processing method is performed by a terminal device, and the terminal device is a User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory. Alternatively, an image to be processed may be acquired by a terminal device or an image acquisition device (e.g., a camera or the like), and the image to be processed is transmitted to a server, so as to execute the method by the server.

In a possible implementation, at operation S11, the image to be processed includes a picture, or a video frame in a video stream, or the like. The target object includes an object such as a person, an animal, or a physical object in the image. The contour line of the target object is recognized by a deep learning-based image recognition method or edge detection or other methods, and a plurality of regions of the target object is determined according to an attribute such as the shape of the target object. For example, if the target object is a person, detection is performed on the image to be processed to recognize a contour line of the person in the image to be processed, and determine image regions such as a head region, an arm region, a chest region, a waist region, and a leg region of the person.

In a possible implementation, at operation S12, one or more regions are selected from the above regions as a target region for adjustment. Target pixel points in the target region are adjusted according to the one or more set parameters by an image adjustment method such as local translation warps. For example, parameters such as adjustment directions and adjustment amplitudes of the target pixel points are determined by means of set adjustment parameters of the target region, and the target pixel points in the target region are adjusted by means of local translation warps based on the parameters such as the adjustment directions and the adjustment amplitudes. All first pixel points on the contour line of the target region may be adjusted (i.e., the contour line of the target region is adjusted), and a third pixel point inside the contour line is adjusted. One or more pixel points on the contour line may also be selected as a first pixel point, one or more pixel points inside the contour line and within a preset range around the first pixel point may be selected as a third pixel point, and the first pixel points and the third pixel points are adjusted. Each first pixel point corresponds to one or more third pixel points, and each first pixel point corresponds to one or more second pixel points.

In an example, a waist region is selected for adjustment, that is, the waist region is used as a target region, and the adjustment includes a adjustment of a first pixel point on a contour line of the waist region and a adjustment of a third pixel point inside the contour line of the waist region, for example, the first pixel point on the contour line of the waist region is adjusted toward the inside of the contour line, and the third pixel point is adaptively adjusted, to produce a waist shaping effect.

In an example, a leg region is selected for adjustment, that is, the leg region is used as a target region, and the adjustment includes a adjustment of a first pixel point on an outer contour line of the leg and a first pixel point on an inner contour line of the leg, and a adjustment of a third pixel point inside a contour line between the inner contour line and the outer contour line. For example, a first pixel point on the outer contour line of the leg is adjusted toward the inner contour line and a third pixel point near the outer contour line is adaptively adjusted, and a first pixel point on the inner contour line of the leg is adjusted toward the outer contour line and a third pixel point near the inner contour line is adaptively adjusted, to produce a leg shaping effect. The adjustment amplitude of the first pixel point on the outer contour line may be greater than the adjustment amplitude of the first pixel point on the inner contour line.

In a possible implementation, the first adjustment parameters include a first adjustment direction and a first adjustment amplitude of the first pixel point, and a third adjustment direction and a third adjustment amplitude of the third pixel point, and the second adjustment parameters include a second adjustment direction and a second adjustment amplitude of the second pixel point. The first adjustment direction is an adjustment direction of the first pixel point when the first pixel point is adjusted, the first adjustment amplitude is an adjustment amplitude of the first pixel point when the first pixel point is adjusted, and the adjustment amplitude may be represented by a distance to be moved by. In an example, in the image to be processed, the adjustment amplitude is represented by the number of pixels to be moved by, for example, adjustment to the left by a distance of 10 pixels. Similarly, the second adjustment direction is an adjustment direction of the second pixel point when the second pixel point is adjusted, and the second adjustment amplitude is an adjustment amplitude of the second pixel point when the second pixel point is adjusted. The third adjustment direction is an adjustment direction of the third pixel point when the third pixel point is adjusted, and the third adjustment amplitude is an adjustment amplitude of the third pixel point when the third pixel point is adjusted.

Figure 2:
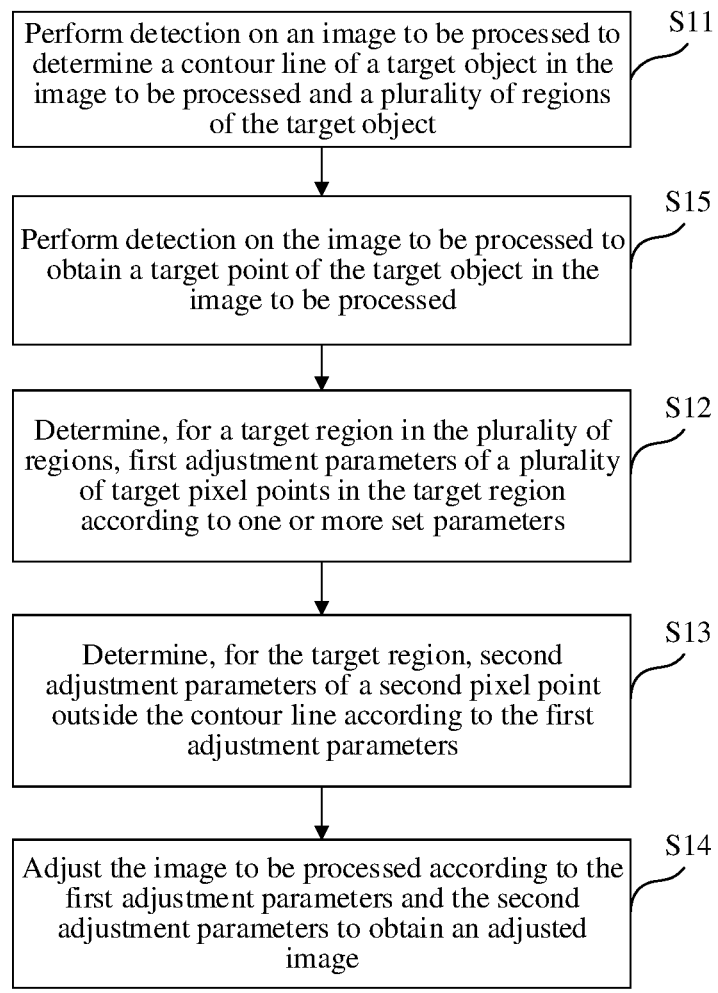
FIG. 2 is a flowchart of an image processing method according to embodiments of the present disclosure.

FIG. 2 is a flowchart of an image processing method according to embodiments of the present disclosure. As shown in FIG. 2, in a possible implementation, the method further includes the following operations.

At operation S15, detection is performed on the image to be processed to obtain a target point of the target object in the image to be processed, where the target point is located inside or on the contour line, and the target point corresponds to the first pixel point, where the first adjustment direction of the first pixel point includes a direction close to or away from the target point.

In a possible implementation, at operation S15, a target point is determined in the image to be processed. The target point may comprise a plurality of target points. Each target point corresponds to one or more first pixel points, and one first pixel point corresponds to one target point. For example, the targets points a and b correspond to first pixel points c, d, e and f, where the target point a corresponds to the first pixel point c and d, and the target point b corresponds to the first pixel point e and f. When the first pixel point is adjusted, the first pixel point targets the target point and may get close to or away from the target point.

In a possible implementation, the target point is inside the contour line. In an example, the target region is a waist region, contour line detection may be performed on the waist region to determine two contour lines of the waist region, and first pixel points on the two contour lines are determined. Further, one or more first pixel points are on each of the two contour lines, and an intermediate point, in the horizontal direction, of two first pixel points having the same height in the vertical direction on the two contour lines is used as a target point. For example, if a left contour line and a right contour line are detected for the waist region in the image to be processed, the target point is located in a region between the left contour line and the right contour line. There is a first pixel point having a vertical height of 200 pixels on the left contour line, there is also a first pixel point having a vertical height of 200 pixels on the right contour line, and the distance between the two pixel points in the horizontal direction is 200 pixels. The midpoint of a connection line between the two first pixel points in the horizontal direction may be selected as a target point. That is, a pixel point having a distance of 100 pixels from the first pixel point on the left or right contour line is used as the target point.

In an example, the target region is a chest region, and an intermediate point, in the horizontal direction, of two first pixel points having the same height in the vertical direction on two contour lines of the chest region is used as a target point. In an example, the target region is a leg region, and when a first pixel point on an outer contour line of the leg is adjusted, a first pixel point on an inner contour line thereof having the same height in the vertical direction as the first pixel point on the outer contour line is used as a target point; when a first pixel point on the inner contour line of the leg is adjusted, a first pixel point on the outer contour line having the same height in the vertical direction as the first pixel point on the inner contour line is used as a target point. The present disclosure does not limit the method for selecting a target point.

In a possible implementation, at operation S12, the first adjustment parameters include a first adjustment direction and a first adjustment amplitude of the first pixel point. The first adjustment direction and the first adjustment amplitude are adjustment parameters determined according to one or more set parameters. For example, the target region is a leg region, and a leg shaping effect is achieved by adjusting target pixel points in the leg region. The adjustment amplitude of a first pixel point on an outer contour line of the leg region is set as adjustment by a distance of 20 pixels, and the adjustment direction is set as a direction close to a target point; the adjustment amplitude of a first pixel point on an inner contour line of the leg region is set as adjustment by a distance of 10 pixels, and the adjustment direction is set as a direction close to a target point.

Figure 3:
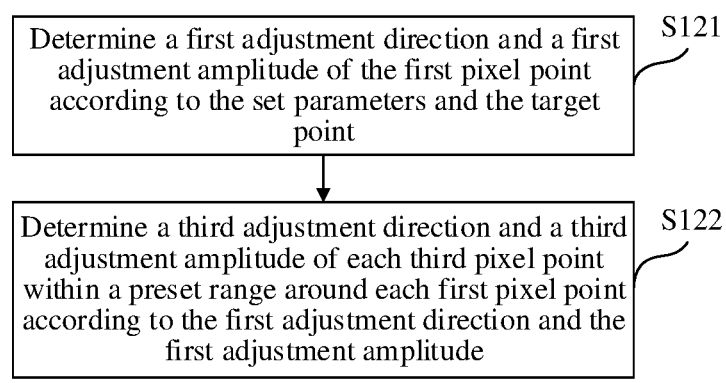
FIG. 3 is a flowchart of operation S12 of an image processing method according to embodiments of the present disclosure.

FIG. 3 is a flowchart of operation S12 of an image processing method according to embodiments of the present disclosure. As shown in FIG. 3, operation S12 includes the following operations.

At operation S121, a first adjustment direction and a first adjustment amplitude of the first pixel point are determined according to the one or more set parameters and the target point.

At operation S122, a third adjustment direction and a third adjustment amplitude of each third pixel point within a preset range around each first pixel point are determined according to the first adjustment direction and the first adjustment amplitude.

In a possible implementation, at operation S121, a first adjustment direction and a first adjustment amplitude are determined according to the one or more set parameters and the target point. In an example, when a selected target region is adjusted, a first pixel point is adjusted according to one or more set parameters and a target point. For example, the target region is a waist, and in order to produce a waist shaping effect, the first adjustment amplitude of a first pixel point is determined as adjustment by a distance of 20 pixels, and the first adjustment direction is determined as a direction close to a target point.

In a possible implementation, at operation S122, a third adjustment amplitude of each third pixel point within a preset range around the first pixel point is determined according to the first adjustment amplitude. In an example, a preset range around a first pixel point is a portion, inside the contour line, of a circular region that is centered on the first pixel point and has a radius being the distance between the first pixel point and a target point. The adjustment amplitude of the third pixel point is related to the distance between the first pixel point and the third pixel point. The third adjustment amplitude of the third pixel point is smaller than the first adjustment amplitude, and the third adjustment amplitude of the third pixel point is negatively correlated with a second reference distance, where the second reference distance is the distance between the third pixel point and the first pixel point. That is, the greater the distance between the third pixel point and the first pixel point, the smaller the third adjustment amplitude of the third pixel point.

In an example, according to the adjustment amplitude of a certain first pixel point, the adjustment amplitude of each third pixel point within a preset range around the first pixel point may be determined, that is, a third pixel point having a greater distance from the first pixel point within the preset range around the first pixel point has a smaller adjustment amplitude. For example, if the first adjustment amplitude of a first pixel point is adjustment by a distance of 15 pixels, the adjustment amplitude of a third pixel point having a distance of 10 pixels from the first pixel point is adjustment by a distance of 10 pixels, the adjustment amplitude of a third pixel point having a distance of 20 pixels from the first pixel point is adjustment by a distance of 5 pixels, or the like. The present disclosure does not limit the adjustment amplitude.

Figure 4:
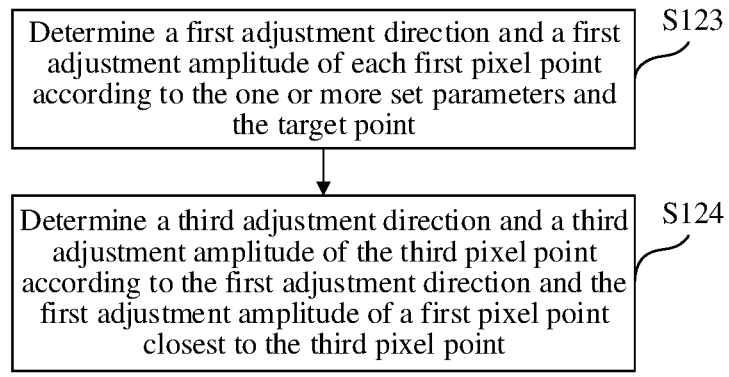
FIG. 4 is a flowchart of operation S12 of an image processing method according to embodiments of the present disclosure.

FIG. 4 is a flowchart of operation S12 of an image processing method according to embodiments of the present disclosure. As shown in FIG. 4, the first adjustment parameters further include a third adjustment direction and a third adjustment amplitude of the third pixel point. Operation S12 may include the following operations.

At operation S123, a first adjustment direction and a first adjustment amplitude of each first pixel point are determined according to the one or more set parameters and the target point.

At operation S124, the third adjustment direction and the third adjustment amplitude of the third pixel point are determined according to the first adjustment direction and the first adjustment amplitude of a first pixel point closest to the third pixel point.

In a possible implementation, at operation S123, a first adjustment direction and a first adjustment amplitude are determined according to the one or more set parameters and the target point. In an example, when a selected first region is adjusted, a first pixel point is adjusted according to one or more set parameters and a target point. For example, the first region is a waist, and in order to produce a waist shaping effect, the first adjustment amplitude of a first pixel point is determined as adjustment by a distance of 20 pixels, and the first adjustment direction is determined as a direction close to a target point.

In a possible implementation, at operation S124, the third adjustment amplitude and the third adjustment direction of the third pixel point are determined according to the first adjustment amplitude of a first pixel point that is closest to the third pixel point. In an example, if the distance between a third pixel point and the closest first pixel point is 10 pixels, the third adjustment amplitude of the third pixel point is determined only according to the first adjustment amplitude of the first pixel point. The third adjustment amplitude of the third pixel point is smaller than the first adjustment amplitude, and the third adjustment amplitude of the third pixel point is negatively correlated with a second reference distance, where the second reference distance is a distance between the third pixel point and the first pixel point. That is, the greater the distance between the third pixel point and the first pixel point, the smaller the third adjustment amplitude of the third pixel point.

Figure 5:
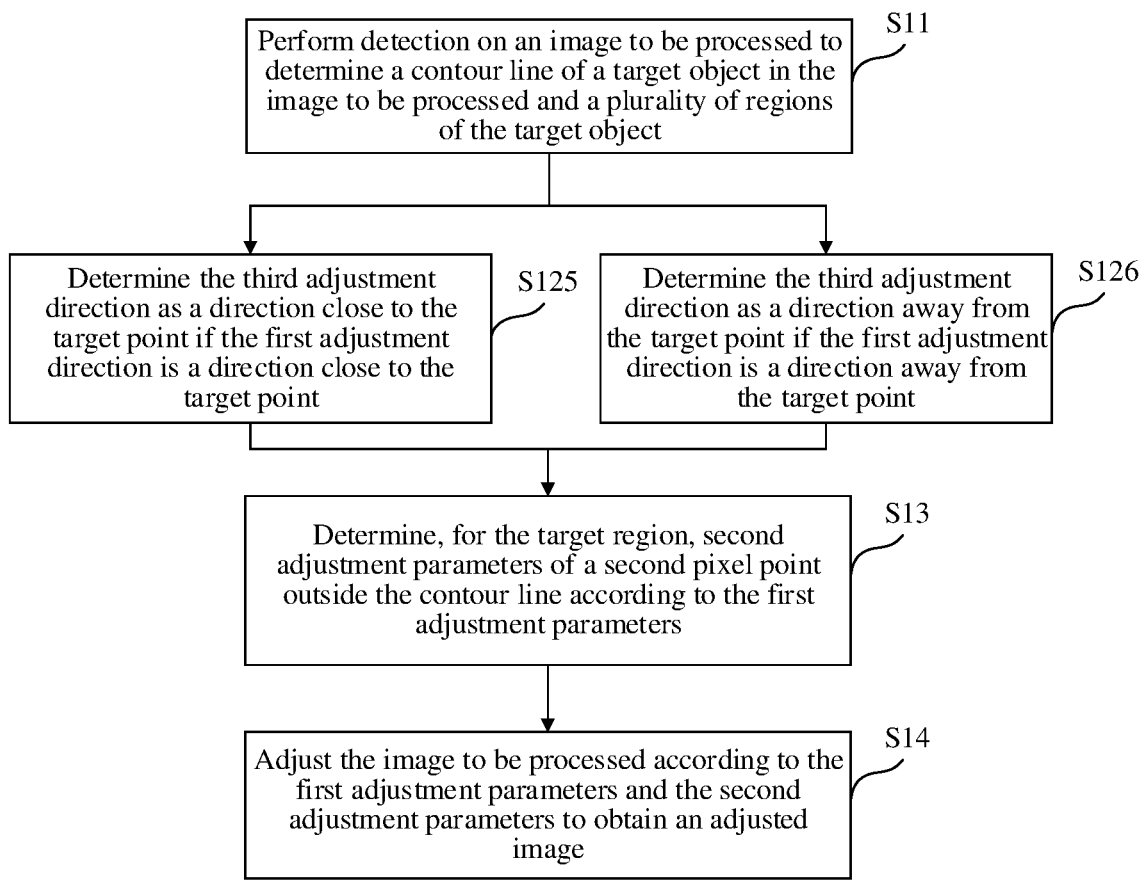
FIG. 5 is a flowchart of an image processing method according to embodiments of the present disclosure.

FIG. 5 is a flowchart of an image processing method according to embodiments of the present disclosure. As shown in FIG. 5, operation S12 includes one of the following operations.

At operation S125, the third adjustment direction is determined as a direction close to the target point if the first adjustment direction is the direction close to the target point.

At operation S126, the third adjustment direction is determined as a direction away from the target point if the first adjustment direction is the direction away from the target point.

In a possible implementation, the third adjustment direction is determined according to operation S125 or operation S126, and the third adjustment amplitude is determined according to operation S122 or operation S124. In an example, the first pixel point is one or more first pixel points selected on the contour line of the target region, and the third adjustment direction and the third adjustment amplitude of each third pixel point within a preset range around the first pixel point are determined according to the adjustment direction and the adjustment amplitude of the first pixel point. If a certain third pixel point is simultaneously within preset ranges around two or more first pixel points, the adjustment direction and the adjustment amplitude of the third pixel point are vector sums of third adjustment directions and third adjustment amplitudes respectively determined according to the first adjustment directions and the first adjustment amplitudes of the two or more first pixel points. In an example, the adjustment of a pixel point is determined according to a vector operation rule, the third adjustment direction is the direction of a vector, the third adjustment amplitude is the size of the vector, and vector addition is performed based on a plurality of third adjustment directions and third adjustment amplitudes determined according to the first adjustment directions and the first adjustment amplitudes of a plurality of first pixel points to determine the final adjustment direction and adjustment amplitude of the third pixel point, respectively. When the first adjustment amplitude and the first adjustment direction of the first pixel point and the third adjustment amplitude and the third adjustment direction of the third pixel point are all determined, the target pixel points in the target region is adjusted according to these first adjustment parameters.

In an example, the target region is a waist region, and a first adjustment amplitude and a first adjustment direction of a first pixel point on a contour line of the waist region are determined according to one or more set parameters. For example, the first adjustment amplitude is adjustment by a distance of 20 pixels, and the first adjustment direction is a direction close to a target point, to produce a waist shaping effect. In third pixel points inside the contour line, for example, if a certain third pixel point is within preset ranges around two first pixel points, and the distance between the third pixel point and one of the first pixel points is 10 pixels, it may be determined according to the distance and the first adjustment amplitude and the first adjustment direction of the first pixel point that the third adjustment amplitude of the third pixel point is adjustment by a distance of 10 pixels, and the third adjustment direction is a direction close to a target point corresponding to the first pixel point. Further, if the distance between the third pixel point and the other first pixel point is 20 pixels, it may be determined according to the distance and the first adjustment amplitude and the first adjustment direction of the other first pixel point that the third adjustment amplitude of the third pixel point is adjustment by a distance of 5 pixels, and the third adjustment direction is a direction close to a target point corresponding to the other first pixel point. The final adjustment amplitude and adjustment direction of the third pixel point may be determined according to a vector operation rule, that is, vector sums composed of vectors respectively corresponding to the two third adjustment directions and the two third adjustment amplitudes are calculated.

In a possible implementation, the third adjustment amplitude and the third adjustment direction of the third pixel point are determined only according to the closest first pixel point. In an example, if the distance between a third pixel point and the closest first pixel point is 10 pixels, the third adjustment amplitude and the third adjustment direction of the third pixel point are determined only according to the first adjustment amplitude and the first adjustment direction of the first pixel point. For example, if the first adjustment amplitude of the first pixel point is adjustment by a distance of 15 pixels and the first adjustment direction is a direction close to a target point corresponding to the first pixel point, the third adjustment amplitude of the third pixel point is adjustment by a distance of 10 pixels and the third adjustment direction is a direction close to the target point corresponding to the first pixel point.

In this way, the third pixel point inside the contour line of the target region may be adjusted when the target pixel points in the target region are adjusted, and the adjustment direction of the third pixel point inside the contour line is adapted to the adjustment direction of the first pixel point on the contour line, thereby achieving overall adjustment of the region inside the contour line, and preventing distortion from occurring in the target region of the image to be processed, and thus, the region inside the contour line of the image may be more naturally adjusted.

In a possible implementation, at operation S13, when adjusting the target region, in addition to adjusting the first pixel point on the contour line and the third pixel point inside the contour line, second adjustment parameters of a second pixel point outside the contour line are also determined according to the first adjustment parameters to adjust the second pixel point in the background region outside the contour line, thereby reducing the influence on the background region and preventing distortion of the image.

Figure 6:
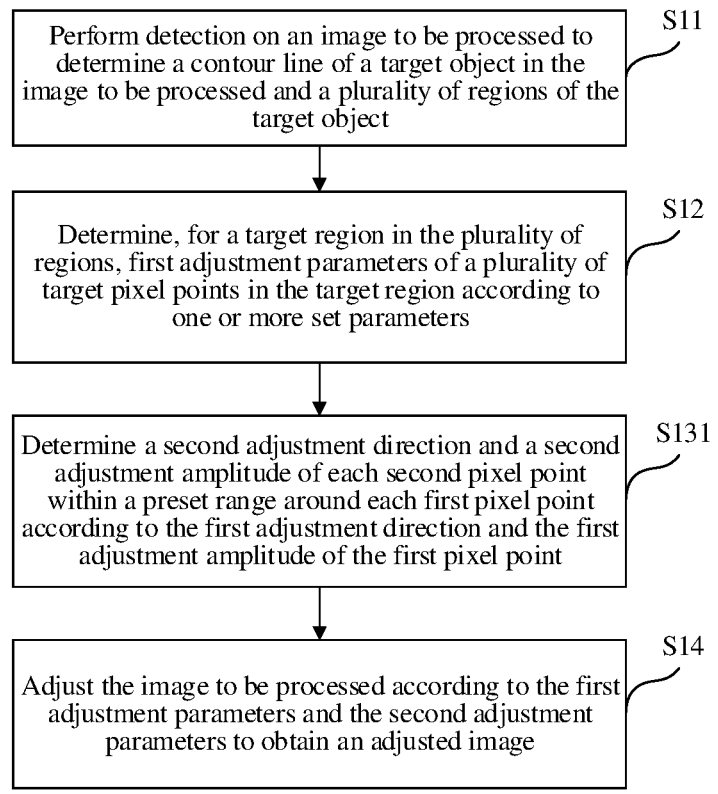
FIG. 6 is a flowchart of an image processing method according to embodiments of the present disclosure.

FIG. 6 is a flowchart of an image processing method according to embodiments of the present disclosure. As shown in FIG. 6, operation S13 includes the following operation.

At operation S131, a second adjustment direction and a second adjustment amplitude of each second pixel point within a preset range around each first pixel point are determined according to the first adjustment direction and the first adjustment amplitude of the first pixel point.

In a possible implementation, the second adjustment amplitude of the second pixel point is determined according to the first adjustment amplitude of the first pixel point. The second adjustment amplitude of the second pixel point is related to the distance between the second pixel point and the first pixel point. The second adjustment amplitude of the second pixel point is smaller than the first adjustment amplitude, and the second adjustment amplitude of the second pixel point is negatively correlated with a first reference distance, where the first reference distance is the distance between the second pixel point and the first pixel point. That is, the greater the distance between the second pixel point and the first pixel point, the smaller the adjustment amplitude of the second pixel point. For example, if the first adjustment amplitude of a first pixel point is adjustment by a distance of 20 pixels, the adjustment amplitude of a second pixel point having a distance of 10 pixels from the first pixel point is adjustment by a distance of 5 pixels, the adjustment amplitude of a second pixel point having a distance of 20 pixels from the first pixel point is adjustment by a distance of 2 pixels, or the like. The present disclosure does not limit the adjustment amplitude.

Figure 7:
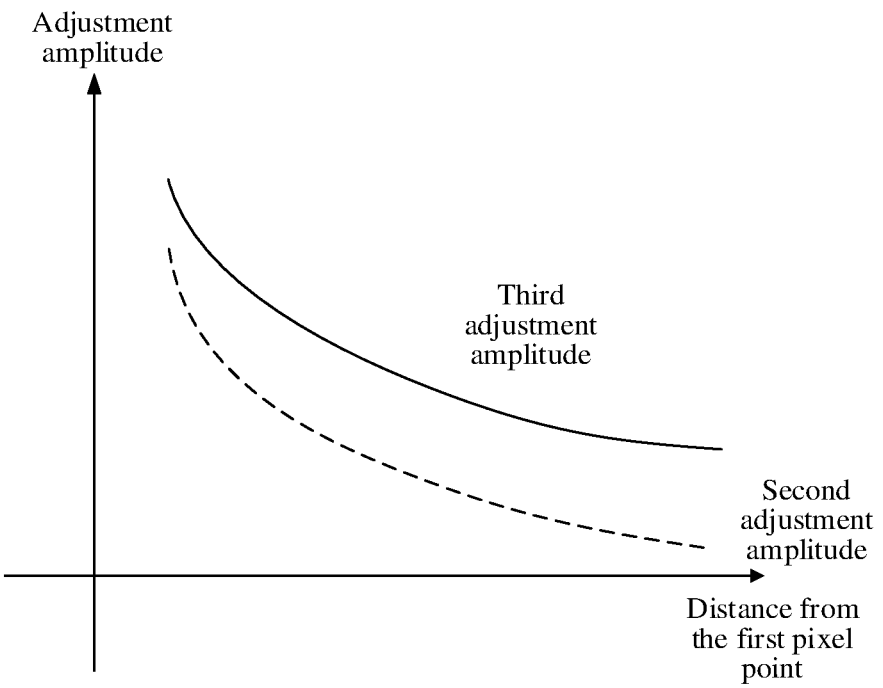
FIG. 7 is a schematic diagram illustrating a relationship between an adjustment amplitude and a distance according to embodiments of the present disclosure.

FIG. 7 is a schematic diagram illustrating a relationship between an adjustment amplitude and a distance according to embodiments of the present disclosure. The solid line in FIG. 7 represents the relationship between the third adjustment amplitude of a third pixel point inside the contour line and a second reference distance (i.e., the distance between the third pixel point and the first pixel point). As shown in FIG. 7, the larger the second reference distance, the smaller the third adjustment amplitude of the third pixel point. The dashed line in FIG. 7 represents the relationship between the second adjustment amplitude of a second pixel point inside the contour line and a first reference distance (i.e., the distance between the second pixel point and the first pixel point). As shown in FIG. 7, the larger the first reference distance, the smaller the second adjustment amplitude of the second pixel point.

In a possible implementation, if the distance between the second pixel point and the first pixel point is equal to the distance between the third pixel point and the first pixel point, the second adjustment amplitude of the second pixel point is smaller than the third adjustment amplitude of the third pixel point. That is, if the distances from the second pixel point outside the contour line and the third pixel point inside the contour line to the first pixel point are the same, the second adjustment amplitude of the second pixel point is smaller than the adjustment amplitude of the third pixel point. For example, if the distance between a third pixel point inside the contour line and a first pixel point is 20 pixels, and the distance between a second pixel point outside the contour line and the first pixel point is also 20 pixels, then the third adjustment amplitude of the third pixel point is smaller than the second adjustment amplitude of the second pixel point. For example, if the first adjustment amplitude of a first pixel point is adjustment by a distance of 20 pixel points, and the distances from a second pixel point and a third pixel point to the first pixel point are each 20 pixels, then the second adjustment amplitude of the second pixel point is adjustment by a distance of 2 pixel points, and the third adjustment amplitude of the third pixel point is adjustment by a distance of 5 pixel points. The present disclosure does not limit the adjustment amplitude.

In an example, the third adjustment amplitude of a third pixel point is a first function of a second reference distance between the third pixel point and a first pixel point, and the function is a monotonically decreasing function, that is, the larger the second reference distance, the smaller the third adjustment amplitude. The second adjustment amplitude of a second pixel point is a second function of a first reference distance between the second pixel point and a first pixel point, and the function is a monotonically decreasing function, that is, the larger the first reference distance, the smaller the second adjustment amplitude. In an example, the decreasing rate of the second function is greater than the decreasing rate of the first function. For example, the second function is an exponential function, and therefore, the second adjustment amplitude decreases exponentially as the first reference distance increases. The first function may be an inversely proportional function, and therefore, the third adjustment amplitude decreases as the second reference distance increases. The present disclosure does not limit the type of the monotonically decreasing function.

In this way, when adjusting pixel points on the contour line, overall adjustment of pixel points inside and outside the contour line is implemented, so that the adjustment effect of the region inside the contour line can be achieved and the influence on the background region outside the contour line is reduced, and thus, the background region is less deformed, distortion of the background region is avoided, and the regions inside and outside the contour line can be more naturally connected.

Figure 8:
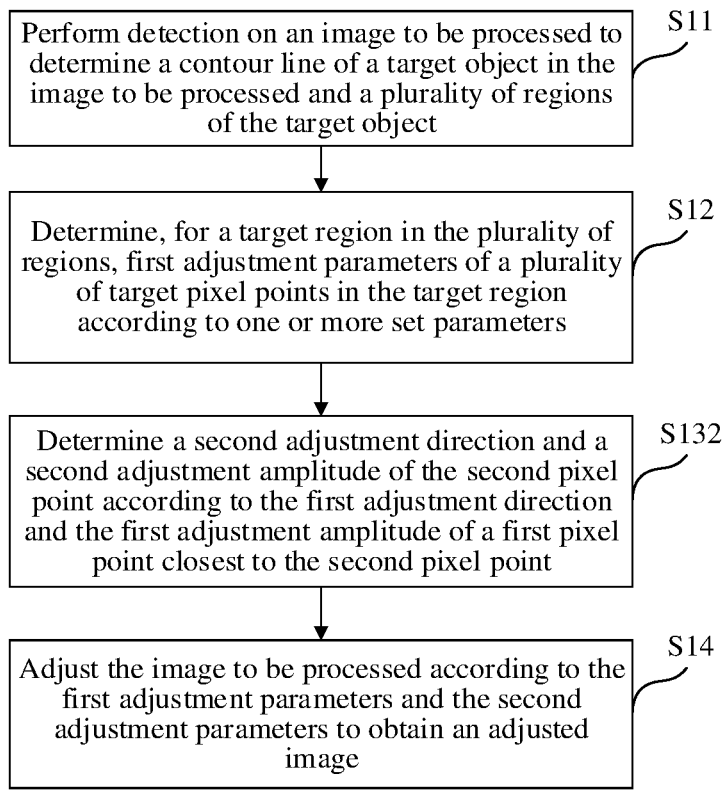
FIG. 8 is a flowchart of an image processing method according to embodiments of the present disclosure.

FIG. 8 is a flowchart of an image processing method according to embodiments of the present disclosure. As shown in FIG. 8, operation S13 includes the following operation.

At operation S132, a second adjustment direction and a second adjustment amplitude of the second pixel point are determined according to the first adjustment direction and the first adjustment amplitude of a first pixel point closest to the second pixel point.

In a possible implementation, the second adjustment amplitude of the second pixel point is determined according to the first adjustment amplitude of a first pixel point that is closest to the second pixel point. In an example, if the distance between a second pixel point and the closest first pixel point is 10 pixels, the second adjustment amplitude of the second pixel point is determined only according to the first adjustment amplitude of the first pixel point. The second adjustment amplitude of the second pixel point is smaller than the first adjustment amplitude, and the second adjustment amplitude of the second pixel point is negatively correlated with a first reference distance, where the first reference distance is the distance between the second pixel point and the first pixel point. That is, the greater the distance between the second pixel point and the first pixel point, the smaller the second adjustment amplitude of the second pixel point.

Figure 9:
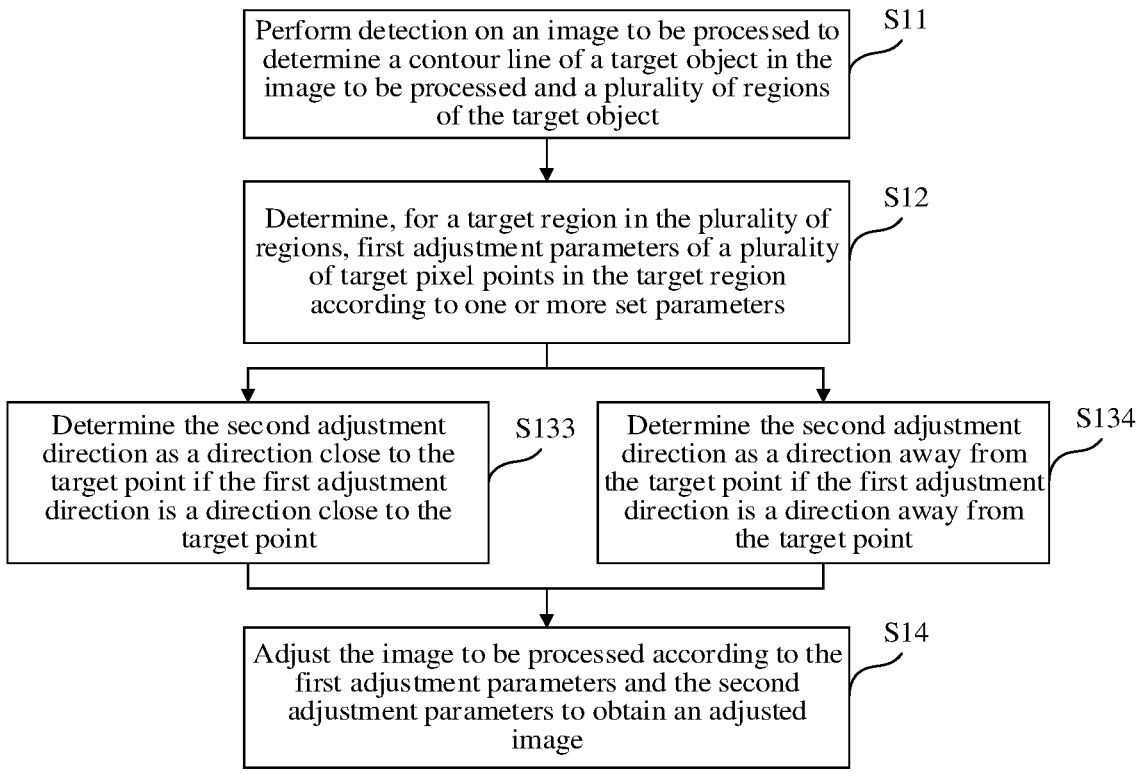
FIG. 9 is a flowchart of an image processing method according to embodiments of the present disclosure.

FIG. 9 is a flowchart of an image processing method according to embodiments of the present disclosure. As shown in FIG. 9, operation S13 includes one of the following operations.

At operation S133, the second adjustment direction is determined as a direction close to the target point if the first adjustment direction is the direction close to the target point.

At operation S134, the second adjustment direction is determined as a direction away from the target point if the first adjustment direction is the direction away from the target point.

In a possible implementation, the second adjustment direction of the second pixel point is determined according to operation S133 or operation S134, and the second adjustment amplitude is determined according to operation S131 or operation S132. That is, if the first adjustment direction is the direction close to the target point, the second adjustment direction is a direction close to the target point, and if the first adjustment direction is the direction away from the target point, the second adjustment direction is a direction away from the target point.

In a possible implementation, if a certain second pixel point is simultaneously close to two or more first pixel points, the adjustment direction and the adjustment amplitude of the second pixel point are vector sums of second adjustment directions and second adjustment amplitudes respectively determined according to the first adjustment directions and the first adjustment amplitudes of the two or more first pixel points. In an example, the adjustment of a pixel point is determined according to a vector operation rule, the second adjustment direction is the direction of a vector, the second adjustment amplitude is the size of the vector, and vector addition is performed based on a plurality of second adjustment directions and second adjustment amplitudes determined according to the first adjustment directions and the first adjustment amplitudes of a plurality of first pixel points to determine the final adjustment direction and adjustment amplitude of the second pixel point, respectively. When the first adjustment amplitude and the first adjustment direction of the first pixel point and the second adjustment amplitude and the second adjustment direction of the second pixel point are all determined, pixel points in the target region is adjusted according to these adjustment parameters.

In an example, if the target region is a waist region, the waist region can be adjusted, and the second adjustment amplitude and the second adjustment direction of a second pixel point outside the contour line of the waist region are determined according to first adjustment parameters and a first reference distance between the second pixel point and a first pixel point. For example, if the first adjustment amplitude is adjustment by a distance of 20 pixels, the first adjustment direction is a direction close to the target point, and a certain second pixel point among second pixel points is close to two first pixel points, the second adjustment parameters of the second pixel point is determined according to the adjustment parameters of the two first pixel points and the distances from the two first pixel points, for example, a first reference distance between the second pixel point and one of the first pixel points is 10 pixels, and a first reference distance between the second pixel point and the other first pixel point is 20 pixels. According to the first adjustment amplitude and the first adjustment direction of the one of the first pixel points and the distance between the second pixel point and the first pixel point, it may be determined that the second adjustment amplitude of the second pixel point is adjustment by a distance of 2 pixels, and the second adjustment direction is a direction close to a target point corresponding to the first pixel point. Further, if the distance between the second pixel point and the other first pixel point is 10 pixels, it may be determined according to the distance and the first adjustment amplitude and the first adjustment direction of the other first pixel point that the second adjustment amplitude of the second pixel point is adjustment by a distance of 5 pixels, and the second adjustment direction is a direction close to a target point corresponding to the other first pixel point. The final adjustment amplitude and adjustment direction of the second pixel point may be determined according to a vector operation rule, that is, vector sums composed of vectors respectively corresponding to the two second adjustment directions and the two second adjustment amplitudes are calculated.

In a possible implementation, the second adjustment amplitude and the second adjustment direction of the second pixel point are determined only according to the closest first pixel point. In an example, if the distance between a second pixel point and the closest first pixel point is 10 pixels, the second adjustment amplitude and the second adjustment direction of the second pixel point are determined only according to the first adjustment amplitude and the first adjustment direction of the first pixel point. For example, if the first adjustment amplitude of the first pixel point is adjustment by a distance of 20 pixels and the first adjustment direction is a direction close to a target point corresponding to the first pixel point, the second adjustment amplitude of the second pixel point is adjustment by a distance of 5 pixels and the second adjustment direction is a direction close to the target point corresponding to the first pixel point.

In this way, when adjusting target pixel points in the target region, the background region outside the contour line can be adaptively adjusted, so that the second adjustment direction of a second pixel point in the background region corresponds to the adjustment direction of a first pixel point, and thus, the background region is naturally connected to the region inside the contour line, the influence on the background region is reduced, and distortion of the background region of the image to be processed is avoided.

In a possible implementation, at operation S14, the image to be processed is adjusted according to the first adjustment parameters and the second adjustment parameters to obtain an adjusted image. The adjusted image may be an image with an effect such as waist shaping or leg shaping, and the background region of the image is less affected.

According to the image processing method provided by the embodiments of the present disclosure, second adjustment parameters of a second pixel point in a background region outside a contour line of a selected target region are determined by first adjustment parameters of target pixel points of the target region, and a third pixel point inside the contour line may be adjusted at the same time, so that pixel points in the background region and inside the contour line can be adaptively adjusted when the contour line of the target region is adjusted, and thus, overall adjustment of regions inside and outside the contour line is implemented and the influence on the background region outside the contour line is reduced when the contour line a target object in the image to be processed is adjusted; further, the adjustment directions of pixel points in regions inside and outside the contour line are adapted to the adjustment direction of a first pixel point on the contour line, and thus, the background region is naturally connected to the region inside the contour line, and distortion of the image is avoided.

Figure 10:
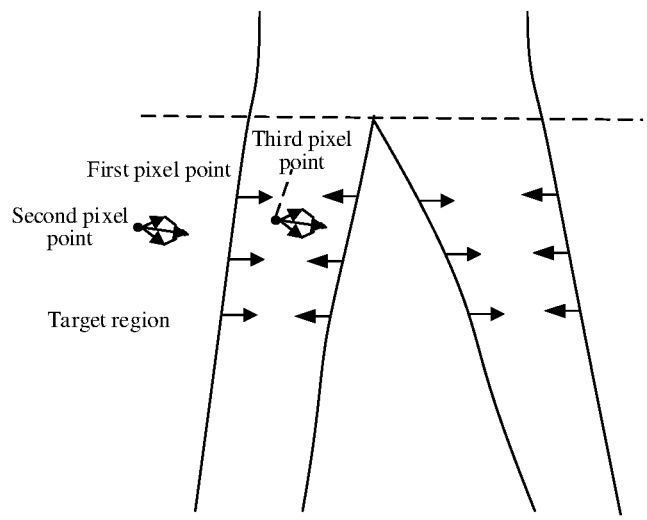
FIG. 10 is a schematic diagram illustrating an application of an image processing method according to embodiments of the present disclosure.

FIG. 10 is a schematic diagram illustrating an application of an image processing method according to embodiments of the present disclosure. As shown in FIG. 10, the selected target region is a leg region. It may be determined according to the one or more set parameters that the first adjustment amplitude of a first pixel point on an outer contour line of the leg is adjustment by a distance of 20 pixels, and the adjustment direction of the first pixel point on the outer contour line is a direction close to its corresponding target point, where the target point of the first pixel point on the outer contour line is a first pixel point on an inner contour line having the same height as the first pixel point on the outer contour line in the vertical direction. The inner contour line of the leg region is adjusted while adjusting the outer contour line of the leg region to avoid image distortion. For example, the first adjustment amplitude of a first pixel point on the inner contour line is set as adjustment by a distance of 5 pixels, and the adjustment direction of the first pixel point on the inner contour line is a direction close to its corresponding target point, where the target point of the first pixel point on the inner contour line is a first pixel point on the outer contour line having the same height as the first pixel point on the inner contour line in the vertical direction.

In a possible implementation, when a first pixel point is adjusted, a third pixel point inside the contour line and within a preset range around the first pixel point is adjusted. The third adjustment amplitude of the third pixel point is negatively correlated with the distance between the third pixel point and the first pixel point, that is, the greater the distance between the third pixel point and the first pixel point, the smaller the adjustment amplitude of the third pixel point. In an example, if the distance between the third pixel point and one first pixel point is 10 pixels, according to the distance and the first adjustment amplitude and the first adjustment direction of the first pixel point, it may be determined that the third adjustment amplitude of the third pixel point is adjustment by a distance of 10 pixels, and the third adjustment direction is a direction close to a target point corresponding to the first pixel point. If the distance between the third pixel point and another first pixel point is 20 pixels, according to the distance and the first adjustment amplitude and the first adjustment direction of the another first pixel point, it may be determined that the third adjustment amplitude of the third pixel point is adjustment by a distance of 5 pixels, and the third adjustment direction is a direction close to a target point corresponding to the another first pixel point. As shown in FIG. 10, the final adjustment amplitude and adjustment direction of the third pixel point may be determined according to a vector operation rule.

In a possible implementation, the third adjustment amplitude and the third adjustment direction of the third pixel point are determined only according to the closest first pixel point. In an example, if the distance between a third pixel point and the closest first pixel point is 10 pixels, the third adjustment amplitude and the third adjustment direction of the third pixel point are determined only according to the first adjustment amplitude and the first adjustment direction of the first pixel point. For example, if the first adjustment amplitude of the first pixel point is adjustment by a distance of 20 pixels and the first adjustment direction is a direction close to a target point corresponding to the first pixel point, the third adjustment amplitude of the third pixel point is adjustment by a distance of 10 pixels and the third adjustment direction is a direction close to the target point corresponding to the first pixel point.

In a possible implementation, when adjusting a second pixel point outside the contour line, the second adjustment amplitude of the second pixel point is determined according to the distance between the second pixel point and a first pixel point, the second adjustment amplitude of the second pixel point is negatively correlated with the distance between the second pixel point and the first pixel point, that is, the greater the distance between the second pixel point and the first pixel point, the adjustment amplitude of the second pixel point. In an example, if the distance between a second pixel point and one first pixel point is 10 pixels, according to the distance and the first adjustment amplitude and the first adjustment direction of the first pixel point, it may be determined that the second adjustment amplitude of the second pixel point is adjustment by a distance of 5 pixels, and the second adjustment direction is a direction close to a target point corresponding to the first pixel point. If the distance between the second pixel point and another first pixel point is 20 pixels, according to the distance and the first adjustment amplitude and the first adjustment direction of the another first pixel point, it may be determined that the second adjustment amplitude of the second pixel point is adjustment by a distance of 2 pixels, and the second adjustment direction is a direction close to a target point corresponding to the another first pixel point. As shown in FIG. 10, the final adjustment amplitude and adjustment direction of the second pixel point may be determined according to a vector operation rule.

In a possible implementation, the second adjustment amplitude and the second adjustment direction of the second pixel point are determined only according to the closest first pixel point. In an example, if the distance between a second pixel point and the closest first pixel point is 10 pixels, the second adjustment amplitude and the second adjustment direction of the second pixel point are determined only according to the first adjustment amplitude and the first adjustment direction of the first pixel point. For example, if the first adjustment amplitude of the first pixel point is adjustment by a distance of 20 pixels and the first adjustment direction is a direction close to a target point corresponding to the first pixel point, the second adjustment amplitude of the second pixel point is adjustment by a distance of 5 pixels and the second adjustment direction is a direction close to the target point corresponding to the first pixel point.

In a possible implementation, pixel points of other regions adjacent to the target region are also adaptively adjusted, so that the contour line of the adjusted image is smooth.

Figure 11:
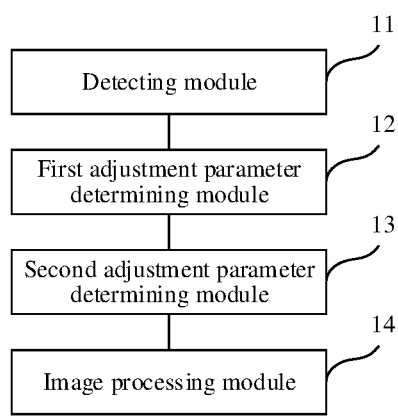
FIG. 11 is a block diagram of an image processing apparatus according to embodiments of the present disclosure.

FIG. 11 is a block diagram of an image processing apparatus according to embodiments of the present disclosure. As shown in FIG. 11, the image processing apparatus includes:

a detecting module 11, configured to perform detection on an image to be processed to determine a contour line of a target object in the image to be processed and a plurality of regions of the target object;

a first adjustment parameter determining module 12, configured to determine, for a target region in the plurality of regions, first adjustment parameters of a plurality of target pixel points in the target region according to one or more set parameters, where the plurality of target pixel points includes a first pixel point on the contour line and a third pixel point inside the contour line;

a second adjustment parameter determining module 13, configured to determine, for the target region, second adjustment parameters of a second pixel point outside the contour line according to the first adjustment parameters; and an image processing module 14, configured to adjust the image to be processed according to the first adjustment parameters and the second adjustment parameters to obtain an adjusted image.

In a possible implementation, the first adjustment parameters include a first adjustment direction and a first adjustment amplitude of the first pixel point, and a third adjustment direction and a third adjustment amplitude of the third pixel point, and the second adjustment parameters include a second adjustment direction and a second adjustment amplitude of the second pixel point.

Figure 12:
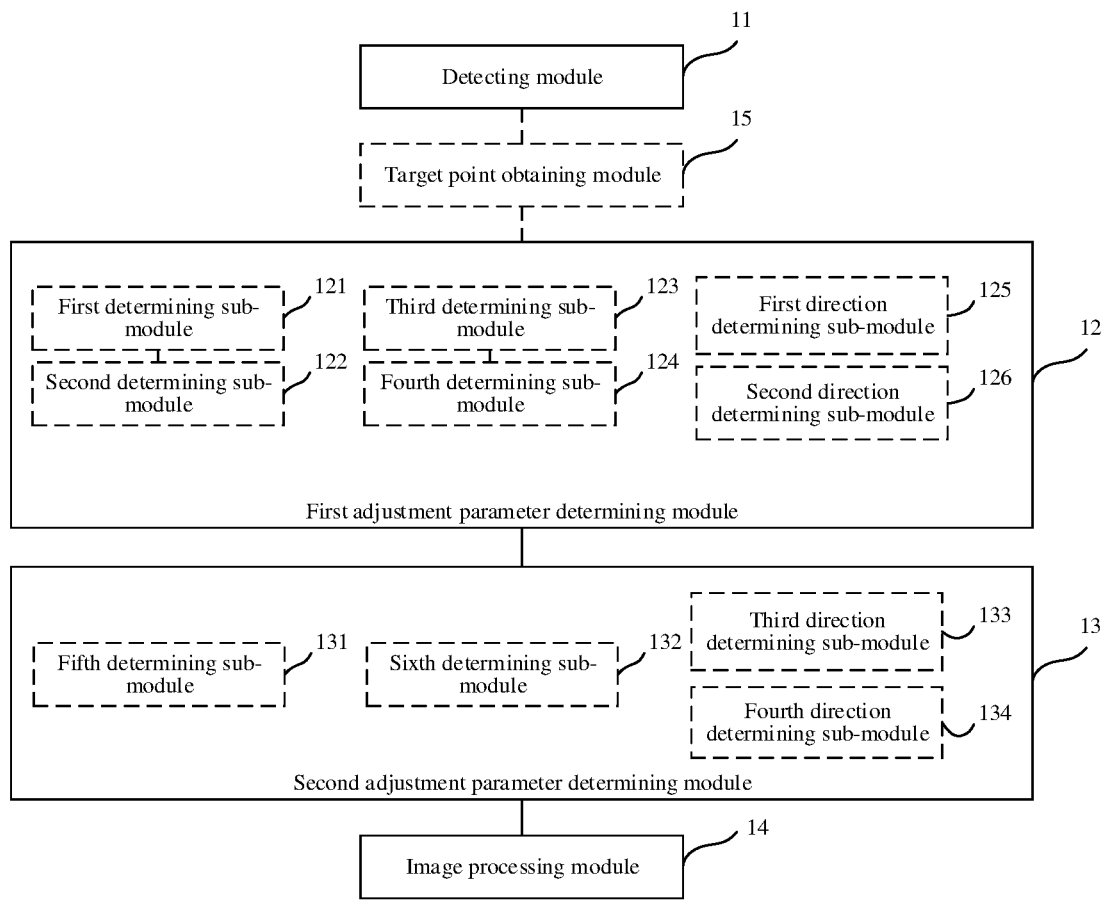
FIG. 12 is a block diagram of an image processing apparatus according to embodiments of the present disclosure.

FIG. 12 is a block diagram of an image processing apparatus according to embodiments of the present disclosure. As shown in FIG. 12, the apparatus further includes:

a target point obtaining module 15, configured to perform detection on the image to be processed to obtain a target point of the target object in the image to be processed, where the target point is located inside the contour line, and the target point corresponds to the first pixel point, where the first adjustment direction of the first pixel point includes a direction close to or away from the target point.

In a possible implementation, the first adjustment parameter determining module 12 includes:

a first determining sub-module 121, configured to determine a first adjustment direction and a first adjustment amplitude of the first pixel point according to the one or more set parameters and the target point; and a second determining sub-module 122, configured to determine a third adjustment direction and a third adjustment amplitude of each third pixel point within a preset range around each first pixel point according to the first adjustment direction and the first adjustment amplitude.

In a possible implementation, the first adjustment parameter determining module 12 includes:

a third determining sub-module 123, configured to determine a first adjustment direction and a first adjustment amplitude of each first pixel point according to the one or more set parameters and the target point; and a fourth determining sub-module 124, configured to determine a third adjustment direction and a third adjustment amplitude of the third pixel point according to the first adjustment direction and the first adjustment amplitude of a first pixel point closest to the third pixel point.

In a possible implementation, the first adjustment parameter determining module 12 includes one of:

a first direction determining sub-module 125, configured to determine the third adjustment direction as a direction close to the target point if the first adjustment direction is the direction close to the target point; and a second direction determining sub-module 126, configured to determine the third adjustment direction as a direction away from the target point if the first adjustment direction is the direction away from the target point.

In a possible implementation, the third adjustment amplitude of the third pixel point is smaller than the first adjustment amplitude, and the third adjustment amplitude of the third pixel point is negatively correlated with a second reference distance, where the second reference distance is a distance between the third pixel point and the first pixel point.

In a possible implementation, the second adjustment parameter determining module 13 includes:

a fifth determining sub-module 131, configured to determine a second adjustment direction and a second adjustment amplitude of each second pixel point within a preset range around each first pixel point according to the first adjustment direction and the first adjustment amplitude of the first pixel point.

In a possible implementation, the second adjustment parameter determining module 13 includes:

a sixth determining sub-module 132, configured to determine a second adjustment direction and a second adjustment amplitude of the second pixel point according to the first adjustment direction and the first adjustment amplitude of a first pixel point closest to the second pixel point.

In a possible implementation, the second adjustment parameter determining module 13 includes one of:

a third direction determining sub-module 133, configured to determine the second adjustment direction as a direction close to the target point if the first adjustment direction is the direction close to the target point; and a fourth direction determining sub-module 134, configured to determine the second adjustment direction as a direction away from the target point if the first adjustment direction is the direction away from the target point.

In a possible implementation, the second adjustment amplitude of the second pixel point is smaller than the first adjustment amplitude, and the second adjustment amplitude of the second pixel point is negatively correlated with a first reference distance, where the first reference distance is a distance between the second pixel point and the first pixel point.

In a possible implementation, if the distance between the second pixel point and the first pixel point is equal to the distance between the third pixel point and the first pixel point, the second adjustment amplitude of the second pixel point is smaller than the third adjustment amplitude of the third pixel point.

It should be understood that the foregoing various method embodiments mentioned in the present disclosure may be combined with each other to form a combined embodiment without departing from the principle logic. Details are not described herein again due to space limitation.

In addition, the present disclosure further provides an image processing apparatus, an electronic device, a computer-readable storage medium, and a program, which can all be used to implement any of the image processing methods provided by the present disclosure. For the corresponding technical solutions and descriptions, please refer to the corresponding content in the method section. Details are not described herein again.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions; where the processor is configured to execute the foregoing method.

The electronic device may be provided as a terminal, a server, or other forms of devices.

Figure 13:
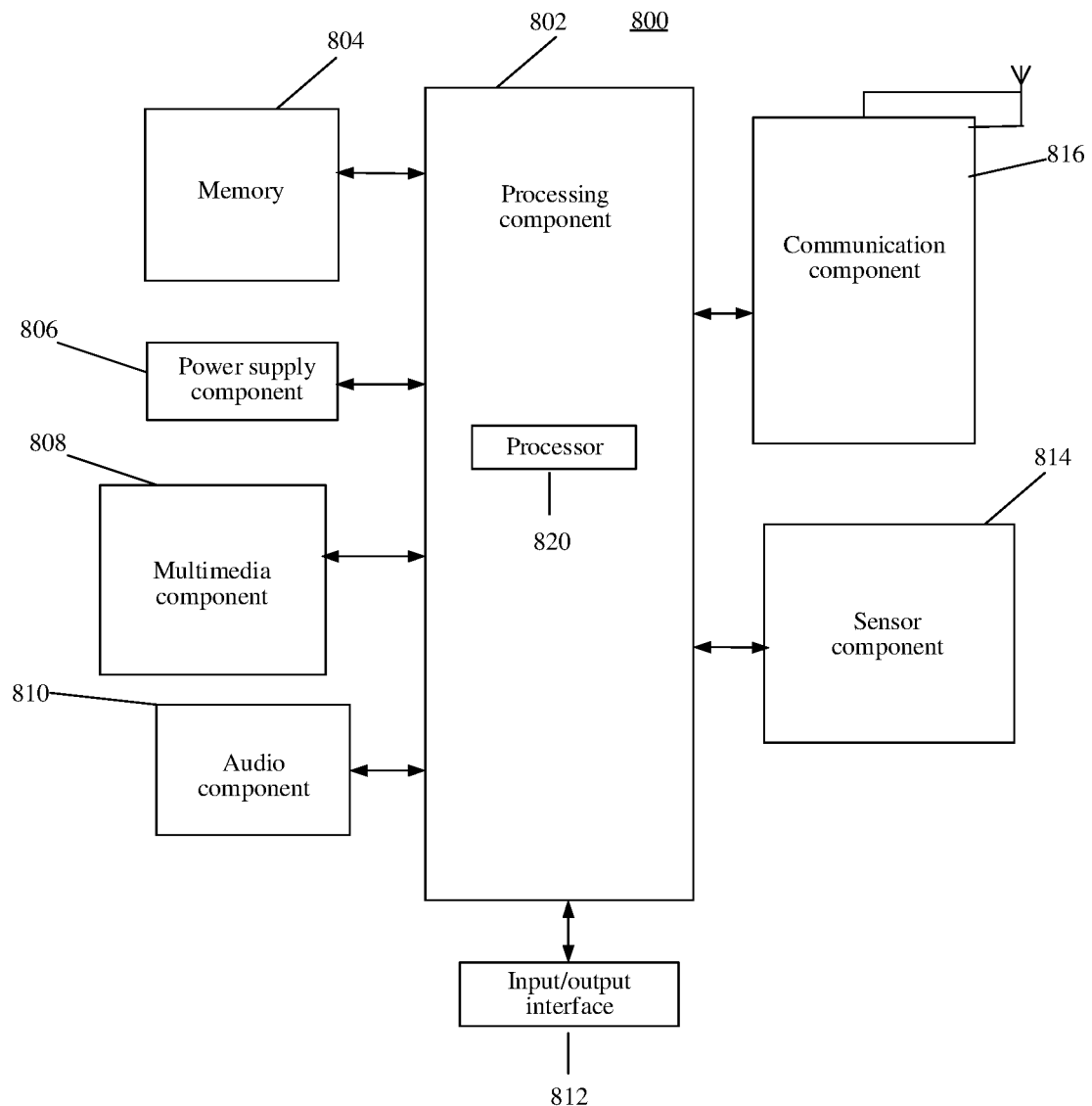
FIG. 13 is a block diagram of an electronic device according to an exemplary embodiment.

FIG. 13 is a block diagram of an electronic device 800 according to an exemplary embodiment. For example, the electronic device 800 may be a terminal such as a mobile phone, a computer, a digital broadcast terminal, a message transceiver device, a game console, a tablet device, a medical device, exercise equipment, and a personal digital assistant.

Referring to FIG. 13, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the operations of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the methods above.

Figure 14:
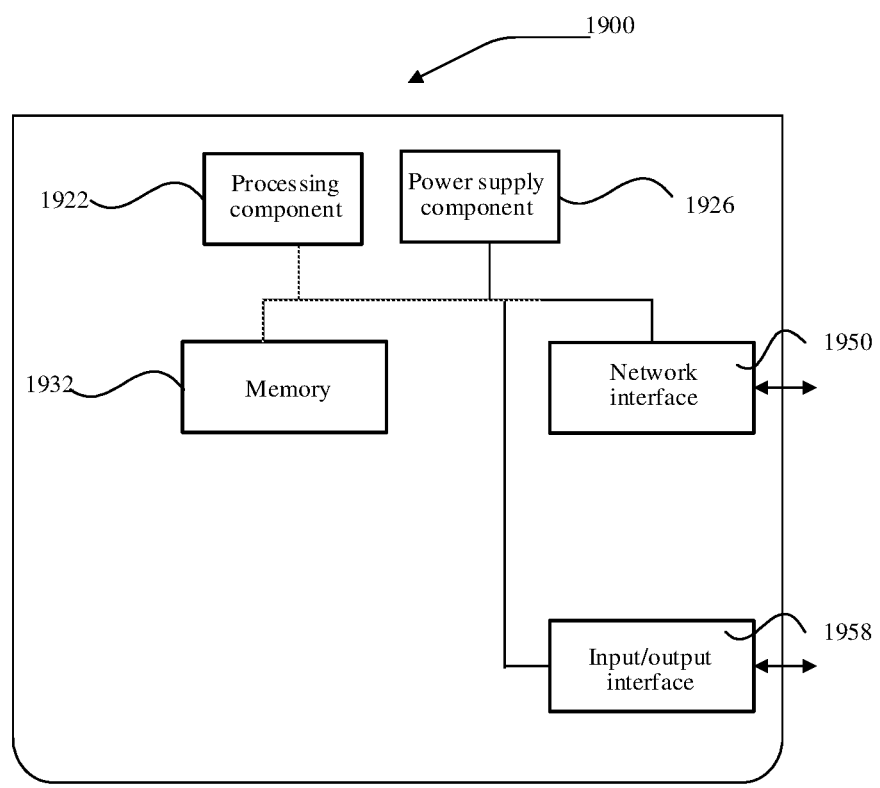
FIG. 14 is a block diagram of an electronic device according to an exemplary embodiment.

FIG. 14 is a block diagram of an electronic device 1900 according to an exemplary embodiment. For example, the electronic device 1900 may be provided as a server. Referring to FIG. 14, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can executed by the processing component 1922 of the electronic device 1900 to implement the method above.

The present disclosure may be a system, a method, and/or a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a Wide Area Network (WAN), or the connection may be made to an external computer (for example, through the Internet using an Internet service provider). In some embodiments, electronic circuitry including, for example, programmable logic circuitry, Field-Programmable Gate Arrays (FPGAs), or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can cause a computer, a programmable data processing apparatus, and/or other devices to function in a particular manner, such that the computer-readable medium having instructions stored therein includes an article of manufacture instructing instructions which implement the aspects of the functions/acts specified in one or more blocks of the flowcharts and/or block diagrams.

The computer-readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart of block diagrams may represent a module, segment, or portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. An image processing method, comprising:
   performing detection on an image to be processed to determine a contour line of a target object in the image to be processed and a plurality of regions of the target object;
   determining, for a target region in the plurality of regions, first adjustment parameters of a plurality of target pixel points in the target region according to one or more set parameters, wherein the plurality of target pixel points comprises one or more first pixel points on the contour line and one or more third pixel points inside the contour line;
   determining, for the target region, second adjustment parameters of one or more second pixel points outside the contour line according to the first adjustment parameters wherein the first adjustment parameters comprise a first adjustment amplitude of each of the one or more first pixel points, and the second adjustment parameters comprise a second adjustment amplitude of each of the one or more second pixel points; and
   adjusting the image to be processed according to the first adjustment parameters and the second adjustment parameters to obtain an adjusted image,
   wherein if a distance between one first pixel point of the one or more first pixel points and a second pixel point of the one or more second pixel points corresponding to the first pixel point is equal to a distance between the first pixel point and a third pixel point of the one or more third pixel points corresponding to the first pixel point, a second adjustment amplitude of the second pixel point corresponding to the first pixel point is smaller than a third adjustment amplitude of the third pixel point corresponding to the first pixel point.

2. The method according to claim 1, wherein the first adjustment parameters further comprise a first adjustment direction of each of the one or more first pixel points, and a third adjustment direction and a third adjustment amplitude of each of the one or more third pixel points, and the second adjustment parameters further comprise a second adjustment direction of each of the one or more second pixel points.

3. The method according to claim 2, further comprising:
   performing detection on the image to be processed to obtain target points of the target object in the image to be processed, wherein the target points are located inside or on the contour line, and each of the target points corresponds to one or more of the one or more first pixel points,
   wherein the first adjustment direction of each of the one or more first pixel points comprises a direction close to or away from the target point.

4. The method according to claim 3, wherein determining, for the target region in the plurality of regions, the first adjustment parameters of the plurality of target pixel points in the target region according to the one or more set parameters comprises:
  determining the first adjustment direction and the first adjustment amplitude of each of the one or more first pixel points according to the one or more set parameters and the target points; and
  determining a third adjustment direction and a third adjustment amplitude of each third pixel point of the one or more third pixel points within a preset range around each of the one or more first pixel points according to the first adjustment direction and the first adjustment amplitude;
  or,
  determining the first adjustment direction and the first adjustment amplitude of each of the one or more first pixel points according to the one or more set parameters and the target points; and
  determining a third adjustment direction and a third adjustment amplitude of each of the one or more third pixel points according to a first adjustment direction and a first adjustment amplitude of a first pixel point of the one or more first pixel points closest to the third pixel point.

5. The method according to claim 3, wherein determining, for the target region in the plurality of regions, the first adjustment parameters of the plurality of target pixel points in the target region according to the one or more set parameters comprises:
  for each of the one or more first pixel points, in response to a first adjustment direction of the first pixel point being the direction close to the target point, determining a third adjustment direction of the third pixel point corresponding to the first pixel point as a direction close to the target point; or
  for each of the one or more first pixel points, in response to a first adjustment direction of the first pixel point being the direction away from the target point, determining a third adjustment direction of the third pixel point corresponding to the first pixel point as a direction away from the target point, and
  wherein determining, for the target region, the second adjustment parameters of the one or more second pixel points outside the contour line according to the first adjustment parameters comprises:
    for each of the one or more first pixel points, in response to a first adjustment direction of the first pixel point being the direction close to the target point, determining a second adjustment direction of the second pixel point corresponding to the first pixel point as a direction close to the target point; or
    for each of the one or more first pixel points, in response to a first adjustment direction of the first pixel point being the direction away from the target point, determining a second adjustment direction of the second pixel point corresponding to the first pixel point as a direction away from the target point.

6. The method according to claim 2, wherein determining, for the target region, the second adjustment parameters of the one or more second pixel points outside the contour line according to the first adjustment parameters comprises:
  determining a second adjustment direction and a second adjustment amplitude of each second pixel point of the one or more second pixel points within a preset range around each of the one or more first pixel points according to the first adjustment direction and the first adjustment amplitude of each of the one or more first pixel points;
  or,
  determining the second adjustment direction and the second adjustment amplitude of each of the one or more second pixel points according to a first adjustment direction and a first adjustment amplitude of a first pixel point of the one or more first pixel points closest to the second pixel point.

7. The method according to claim 2, wherein the second adjustment amplitude of each of the one or more second pixel points is smaller than a first adjustment amplitude of a respective one of the one or more first pixel points, and the second adjustment amplitude of each of the one or more second pixel points is negatively correlated with a first reference distance,
  wherein the first reference distance is a distance between each of the one or more second pixel points and a respective one of the one or more first pixel points.

8. The method according to claim 2, wherein the third adjustment amplitude of each of the one or more third pixel points is smaller than the first adjustment amplitude of a respective one of the one or more first pixel points, and the third adjustment amplitude of the third pixel point is negatively correlated with a second reference distance,
  wherein the second reference distance is a distance between each of the one or more third pixel points and a respective one of the one or more first pixel point.

9. An electronic device, comprising:
  a processor; and
  a memory for storing instructions executable by the processor;
  wherein when the instructions are executed by the processor, the processor is configured to:
    perform detection on an image to be processed to determine a contour line of a target object in the image to be processed and a plurality of regions of the target object;
    determine, for a target region in the plurality of regions, first adjustment parameters of a plurality of target pixel points in the target region according to one or more set parameters, wherein the plurality of target pixel points comprises one or more first pixel points on the contour line and one or more third pixel points inside the contour line;
    determine, for the target region, second adjustment parameters of one or more second pixel points outside the contour line according to the first adjustment parameters, wherein the first adjustment parameters comprise a first adjustment amplitude of each of the one or more first pixel points, and the second adjustment parameters comprise a second adjustment amplitude of each of the one or more second pixel points; and
    adjust the image to be processed according to the first adjustment parameters and the second adjustment parameters to obtain an adjusted image,
    wherein if a distance between one first pixel point of the one or more first pixel points and a second pixel point of the one or more second pixel points corresponding to the first pixel point is equal to a distance between the first pixel point and a third pixel point of the one or more third pixel points corresponding to the first pixel point, a second adjustment amplitude of the second pixel point corresponding to the first pixel point is smaller than a third adjustment amplitude of the third pixel point corresponding to the first pixel point.

10. The electronic device according to claim 9, wherein the first adjustment parameters further comprise a first adjustment direction of each of the one or more first pixel points, and a third adjustment direction and a third adjustment amplitude of each of the one or more third pixel points, and the second adjustment parameters further comprise a second adjustment direction of each of the one or more second pixel points.

11. The electronic device according to claim 10, wherein the processor is further configured to:
  perform detection on the image to be processed to obtain target points of the target object in the image to be processed, wherein the target points are located inside or on the contour line, and each of the target points corresponds to one or more of the one or more first pixel points,
  wherein the first adjustment direction of each of the one or more first pixel points comprises a direction close to or away from the target point.

12. The electronic device according to claim 11, wherein the processor is specifically configured to:
  determine the first adjustment direction and the first adjustment amplitude of each of the one or more first pixel points according to the one or more set parameters and the target points; and
  determine a third adjustment direction and a third adjustment amplitude of each third pixel point of the one or more third pixel points within a preset range around each of the one or more first pixel points according to the first adjustment direction and the first adjustment amplitude;
  or,
  the processor is specifically configured to:
  determine the first adjustment direction and the first adjustment amplitude of each of the one or more first pixel points according to the one or more set parameters and the target points; and
  determine a third adjustment direction and a third adjustment amplitude of each of the one or more third pixel points according to a first adjustment direction and a first adjustment amplitude of a first pixel point of the one or more first pixel points closest to the third pixel point.

13. The electronic device according to claim 11, wherein the processor is specifically configured to:
  for each of the one or more first pixel points, in response to a first adjustment direction of the first pixel point being the direction close to the target point, determine a third adjustment direction of the third pixel point corresponding to the first pixel point as a direction close to the target point; or
  for each of the one or more first pixel points, in response to a first adjustment direction of the first pixel point being the direction away from the target point, determine a third adjustment direction of the third pixel point corresponding to the first pixel point as a direction away from the target point; and
  the processor is specifically configured to:
  for each of the one or more first pixel points, in response to a first adjustment direction of the first pixel point being the direction close to the target point, determine a second adjustment direction of the second pixel point corresponding to the first pixel point as a direction close to the target point; or
  for each of the one or more first pixel points, in response to a first adjustment direction of the first pixel point being the direction away from the target point, determine a second adjustment direction of the second pixel point corresponding to the first pixel point as a direction away from the target point.

14. The electronic device according to claim 10, wherein the processor is specifically configured to:
  determine a second adjustment direction and a second adjustment amplitude of each second pixel point of the one or more second pixel points within a preset range around each of the one or more first pixel points according to the first adjustment direction and the first adjustment amplitude of each of the one or more first pixel points;
  or,
  the processor is specifically configured to:
  determine the second adjustment direction and the second adjustment amplitude of each of the one or more second pixel points according to a first adjustment direction and a first adjustment amplitude of a first pixel point of the one or more first pixel points closest to the second pixel point.

15. The electronic device according to claim 10, wherein the second adjustment amplitude of each of the one or more second pixel points is smaller than a first adjustment amplitude of a respective one of the one or more first pixel points, and the second adjustment amplitude of each of the one or more second pixel points is negatively correlated with a first reference distance,
  wherein the first reference distance is a distance between each of the one or more second pixel points and a respective one of the one or more first pixel points.

16. The electronic device according to claim 10, wherein the third adjustment amplitude of each of the one or more third pixel points is smaller than the first adjustment amplitude of a respective one of the one or more first pixel points, and the third adjustment amplitude of the third pixel point is negatively correlated with a second reference distance,
  wherein the second reference distance is a distance between each of the one or more third pixel points and a respective one of the one or more first pixel point.

17. A non-transitory computer-readable storage medium, having computer program instructions stored thereon, wherein execution of the computer program instructions by a processor causes the processor to perform:
  performing detection on an image to be processed to determine a contour line of a target object in the image to be processed and a plurality of regions of the target object;
  determining, for a target region in the plurality of regions, first adjustment parameters of a plurality of target pixel points in the target region according to one or more set parameters, wherein the plurality of target pixel points comprises one or more first pixel points on the contour line and one or more third pixel points inside the contour line;
  determining, for the target region, second adjustment parameters of one or more second pixel points outside the contour line according to the first adjustment parameters, wherein the first adjustment parameters comprise a first adjustment amplitude of each of the one or more first pixel points, and the second adjustment parameters comprise a second adjustment amplitude of each of the one or more second pixel points; and adjusting the image to be processed according to the first adjustment parameters and the second adjustment parameters to obtain an adjusted image, wherein if a distance between one first pixel point of the one or more first pixel points and a second pixel point of the one or more second pixel points corresponding to the first pixel point is equal to a distance between the first pixel point and a third pixel point of the one or more third pixel points corresponding to the first pixel point, a second adjustment amplitude of the second pixel point corresponding to the first pixel point is smaller than a third adjustment amplitude of the third pixel point corresponding to the first pixel point.

18. The non-transitory computer-readable storage medium according to claim 17, wherein the first adjustment parameters further comprise a first adjustment direction of each of the one or more first pixel points, and a third adjustment direction and a third adjustment amplitude of each of the one or more third pixel points, and the second adjustment parameters further comprise a second adjustment direction of each of the one or more second pixel points.

* * * * *